(12) United States Patent
Villbrandt et al.

(10) Patent No.: US 6,171,183 B1
(45) Date of Patent: Jan. 9, 2001

(54) ACTUATION MEANS FOR ACTUATING A STRUCTURAL PART IN AN AUTOMOBILE

(75) Inventors: Ute Villbrandt, Henstedt-Ulzburg; Roland Klein, Ammersbek, both of (DE)

(73) Assignee: ITW-ATECO GmbH, Norderstedt (DE)

( * ) Notice: Under 35 U.S.C. 154(b), the term of this patent shall be extended for 0 days.

(21) Appl. No.: 09/002,396

(22) Filed: Jan. 2, 1998

(30) Foreign Application Priority Data

Jan. 21, 1997 (DE) .......................................... 297 00 940 U

(51) Int. Cl.⁷ ....................................................... B60H 1/24
(52) U.S. Cl. .................. 454/69; 251/64; 251/294
(58) Field of Search ................. 454/69; 251/64, 251/294, 305

(56) References Cited

U.S. PATENT DOCUMENTS 4,602,828 * 7/1986 Omata ................................... 312/319
4,854,344 * 8/1989 Schnipke .............................. 137/606

FOREIGN PATENT DOCUMENTS

| 2 614 710 | * 11/1988 | (FR) | ........................................ 454/69 |
| 961489 | * 6/1964 | (GB) | ........................................ 454/69 |
| 62-80119 | * 4/1987 | (JP) | ........................................ 454/69 |

* cited by examiner

Primary Examiner—Harold Joyce
(74) Attorney, Agent, or Firm—Schwartz & Weinrieb

(57) ABSTRACT

Actuation means for actuating a structural part in an automobile, particuarly a flap for a fan, wherein the part is pivotally supported about an axis, comprising
  a pull wire
  a power transfer component connected to the pull wire and the structural part, and
  a damper coupled to the power transfer component or the structural part, with the power transfer component including a resilient portion such that upon exerting tension on the power transfer component the resilient portion is deformed until a force is transferred to the structural part or the damper element, respectively.

20 Claims, 1 Drawing Sheet

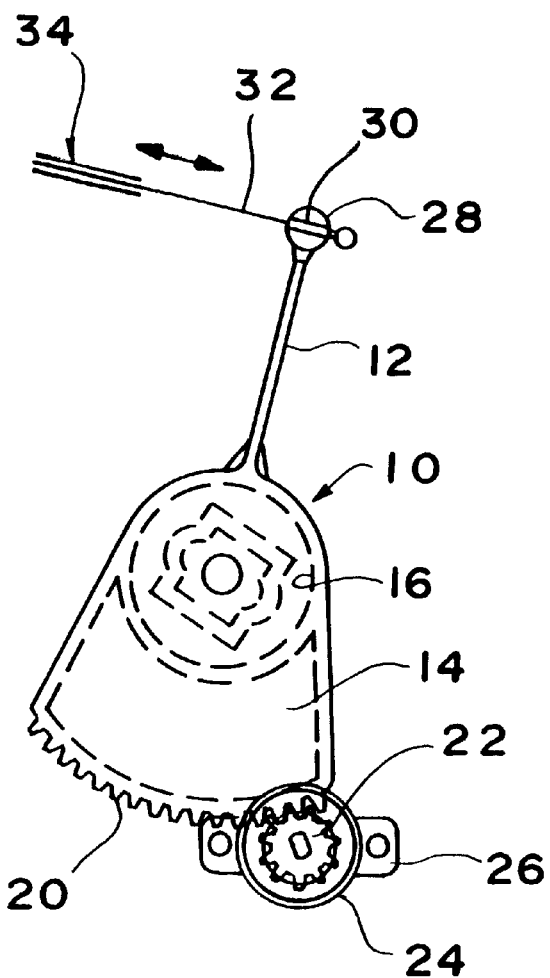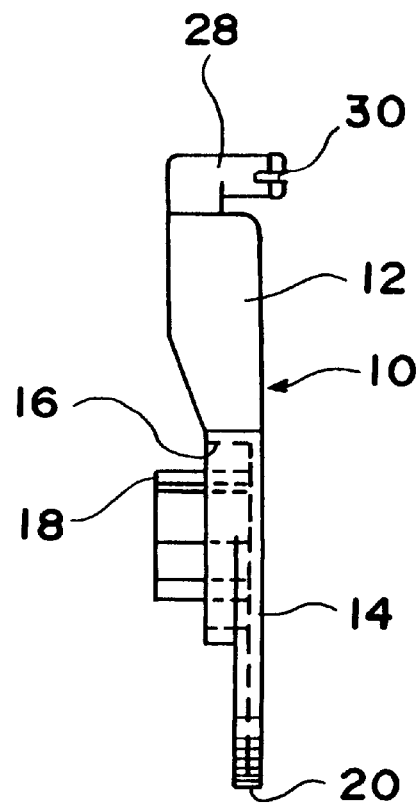
FIG. 1
FIG. 2

ACTUATION MEANS FOR ACTUATING A STRUCTURAL PART IN AN AUTOMOBILE

FIELD OF THE INVENTION

The present relates generally to an actuating means for actuating a structural part in an automobile to an actuating means for actuating particularly in a flap for a fan of an automobide air conditioning system.

BACKGROUND OF THE INVENTION

Flaps for fans in automobiles are actuated manually and/or automatically such as for example in air conditioning systems. When the fan flap is actuated rapidly, it occurs quite often that the fan flap strikes against an abutment of the fan housing in the opening or closing position so as to generate an undesired noise. Fan flaps are generally actuated by so-called Bowden wires.

It has become known to dampen members rotatably mounted in the automobile, such as the flap of a glove compartment, the cover of an ashtray or similar structural members, by having them cooperate with a rotary damper which includes a pinion cooperating with a toothed segment of the member to be dampened. The rotary dampers are intended to prevent shocks affecting the members and generating noises. However, direct coupling between rotary dampers and fan flaps is inappropriate for actuation reasons.

OBJECT OF THE INVENTION

The problem to be solved by the invention is to provide an actuating means for actuating a structural part in an automobile, particularly a flap for a fan, which includes a wire pull and which is adapted to provide an effective damping action.

SUMMARY OF THE INVENTION

In the actuation means of the invention a force transmitting means is connected to the cable or wire pull, which force transmitting means includes a resilient portion positioned in the force transmitting path. When a tension force is exerted on the wire pull, initially the elastic portion is deformed before a force is transmitted to the structural member, such as for example a fan flap to be pivoted. Only after a predetermined deformation of the elastic portion has occurred, the force inherent in the deformed portion results in a movement of the structural member, such as for example a pivotal movement. The damper means can be coupled to the force transmitting means or, respectively, to the output of the force transmitting means or to the structural member to be actuated. Such a damping means may be for example a rotary damper including a pinion which meshes with a toothed segment of the force transmitting member or, respectively, the structural member.

The design of such force transmitting means encompasses various types. A preferred embodiment provides that a two-armed lever is attached to the structural part for rotation therewith such that the structural part is being pivoted upon pivotal movement of the lever. Preferably, this is obtained by positioning the pivot axis of the lever coaxial to the pivot axis of the structural part, for example upon the bearing pin of the structural part. The wire pull engages an arm of the lever while the damping element cooperates with the second arm of the lever. The first arm of the lever is formed as a mounting member of plastic or metal so as to be resilient whereas the second arm is relatively rigid. When the wire pull is used to rotate the lever, the lever arm is initially deflected due to the damping torque of the damping element before it begins to rotate so as to cause pivoting of the structural part. As a result the structural part is rotated to its new position in a delayed manner.

According to a modification of the invention the first arm of the lever preferably comprises a leaf spring of plastic or metal. It may be integral with the second arm of the lever or may be formed as a separate part. The second arm of the lever, according to a further modification of the invention, includes a toothed segment of circular arc shape, which cooperates with a pinion of a stationary rotary damper. Preferably, the entire lever is an integral one-piece member, preferably of a suitable plastic material or metal. Furthermore, an adapter portion may be formed upon the lever so as to allow for coupling thereof to the structural part, for example a fan flap, for rotation therewith.

BRIEF DESCRIPTION OF THE DRAWINGS

Various other objects, features, and attendant advantages of the present invention will be explained in more detail by the following detailed description when considered with reference to the drawings in which like or corresponding parts are designated by like of corresponding reference characters throughout the several views, and wherein.

FIG. 1 is side elevation of a schematic representation of an actuating means according to the invention.

FIG. 2 is an end elevational view of the actuation means of FIG. 1.

DESCRIPTION OF THE ILLUSTRATED EMBODIMENTS

FIGS. 1 and 2 show a two-armed lever 10 including a first lever arm 12 and a second lever arm 14. The plate-like lever arm 14 has on one flat side a recess 16 of circular arc shape (indicated by dotted lines). Within this recess 16 there is provided a lateral extension 18 serving as an adapter to allow for coupling the lever arm 14 to a rotatably mounted fan flap (not shown) in an automobile for rotation therewith. The axis of rotation of the fan flap is preferably coaxial to the axis of the lateral extension 18.

The lever arm 14 includes a toothed segment 20 of circular arc shape which meshes with a pinion 22 of a rotary damper 24. The rotary damper 24 is mounted upon a support member of the automobile by means of radial brackets 26. The rotary damper 24 is of a conventional type and includes for example a rotor within a cylindrical housing which contains a damping fluid such as silicon oil. Friction within the rotary damper 24 provides for a predetermined damping force to be overcome when the rotor and, respectively, the pinion 22 is being rotated.

The upper portion of the lever arm 12 is formed as a leaf spring. It should be noted that alternative advantageous configurations of the resilient lever arm can be provided. The upper end of the lever arm 12 has a holding portion 28 including a slot 30 for mounting a wire 32 of a Bowden wire pull 34.

If a tension force is exerted upon the lever arm 12 by means of the Bowden wire pull 34, initially the resilient portion of the lever arm 12 is deformed whereby only eventually a respective torque will be transmitted to the rotary damper 24. As a result actuation of the fan flap is delayed and dampened.

Obviously, many variations and modifications of the present invention are possible in light of the above teachings. It is therefore to be understood that within the scope of the appended claims, the present invention may be practiced otherwise than as specifically described herein.

What is claimed is:

1. Actuation means for actuating a structural part, comprising:
   a structural part to be actuated;
   pull wire;
   power transfer means connected to said pull wire and to said structural part; and
   damper means operatively connected to said power transfer means
   wherein said power transfer means comprises a resilient portion such that when tension is exerted upon said power transfer means by said pull wire, said resilient portion of said power transfer means is initially deformed, and subsequently a force is transmitted to said structural part so as to actuate said structural part in a dampened manner as determined by said dampering means.

2. The actuation means of claim 1, wherein said power transfer means comprises:
   a two-armed lever wherein a first arm of said two-armed lever comprises said resilient portion which is attached at a first end thereof to said pull wire, and a second arm of said two-armed lever comprises a substantially rigid portion having a first end thereof integrally connected to a second end of said first lever arm, having means for mounting said structural part thereon, and being operatively connected at a second end thereof to said damper means.

3. The actuation means of claim 2, wherein:
   said structural part is adapted to be moved about a pivot axis; and
   said two-armed lever has a pivot axis which is coaxial with said pivot axis of said structural part.

4. The actuation means of claim 2, wherein:
   said first lever arm comprises a leaf spring.

5. The actuation means of claim 2, wherein:
   said first end of said first lever arm has a slot-shaped reception means for accommodating said pull wire.

6. The actuation means of claim 2, wherein:
   said damper means comprises a stationarily located rotary damper; and
   said second lever arm has an arcuate tooth segment formed thereon which cooperates with a rotary pinion of said stationarily located rotary damper.

7. The actuation means of claim 2, wherein:
   said two-armed lever is integrally formed of plastic material; and
   an adapter portion is formed upon said second lever arm for connection with said structural part for rotation therewith.

8. The actuation means as set forth in claim 7, further comprising:
   recess means defined within said second lever arm for accommodating said adapter portion.

9. The actuation means as set forth in claim 1, wherein:
   said pull wire comprises a Bowden wire.

10. The actuation means as set forth in claim 1, wherein:
    said structural part comprises a fan flap member of an automotive air-conditioning system.

11. Actuation means for actuating a structural part, comprising:
    a structural part to be actuated;
    a pull wire;
    power transfer means connected to said pull wire and to said structural part; and
    damper means operatively connected to said structural part;
    wherein said power transfer means comprises a resilient portion such that when tension is exerted upon said power transfer means by said pull wire, said resilient portion of said power transfer means is initially deformed, and subsequently a force is transmitted to said structural part so as to actuate said structural part in a dampened manner as determined by said damper means.

12. The actuation means of claim 11, wherein said power transfer means comprises:
    a two-armed lever wherein a first arm of said two-armed lever comprises said resilient portion which is attached at a first end thereof to said pull wire, and a second arm of said two-armed lever comprises a substantially rigid portion having a first end thereof integrally connected to a second end of said first lever arm, having means for mounting said structural part thereon, and being operatively connected at a second end thereof to said damper means.

13. The actuation means of claim 10, wherein:
    said structural part is adapted to be moved about a pivot axis; and
    said two-armed lever has a pivot axis which is coaxial with said pivot axis of said structural part.

14. The actuation means of claim 10, wherein:
    said first lever arm comprises a leaf spring.

15. The actuation means of claim 10, wherein:
    said first end of said first lever arm has a slot-shaped reception means for accommodating said pull wire.

16. The actuation means of claim 10, wherein:
    said damper means comprises a stationarily located rotary damper; and
    said second lever arm has an arcuate tooth segment formed thereon which cooperates with a rotary pinion of said stationarily located rotary damper.

17. The actuation means of claim 10, wherein:
    said two-armed lever is integrally formed of plastic material; and
    an adapter portion is formed upon said second lever arm for connection with said structural part for rotation therewith.

18. The actuation means as set forth in claim 17, further comprising:
    recess means defined within said second lever arm for accommodating said adapter portion.

19. The actuation means as set forth in claim 9, wherein:
    said pull wire comprises a Bowden wire.

20. The actuation means as set forth in claim 10, wherein:
    said structural part comprises a fan flap member of an automotive air-conditioning system.

* * * * *